(12) United States Patent
Butler et al.

(10) Patent No.: US 6,460,057 B1
(45) Date of Patent: Oct. 1, 2002

(54) DATA OBJECT MANAGEMENT SYSTEM

(75) Inventors: Nicholas David Butler, Romsey; Philip Randall Coxhead, Winchester; Rachel Edwina Jackson, Salisbury; Sanjay Nagchowdhury, Greenford, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/060,680

(22) Filed: Apr. 15, 1998

(30) Foreign Application Priority Data

May 6, 1997 (GB) .............................. 9709184

(51) Int. Cl.[7] .................. G06F 15/00; G06F 17/24; G06F 9/00; G06F 17/00
(52) U.S. Cl. .................. 707/500.1; 709/107; 700/90
(58) Field of Search ........................ 707/100, 101, 707/500.1; 709/107, 328, 302; 713/200; 395/200, 702; 345/349, 332; 700/90; 704/278, 260; 319/88.25

(56) References Cited

U.S. PATENT DOCUMENTS

| | | | | |
|---|---|---|---|---|
| 5,054,054 A | * | 10/1991 | Pessia | 379/88.25 |
| 5,367,609 A | * | 11/1994 | Hopper et al. | 704/278 |
| 5,421,012 A | * | 5/1995 | Khoyi et al. | 709/107 |
| 5,684,984 A | * | 11/1997 | Jones et al. | 707/10 |
| 5,731,813 A | * | 3/1998 | O'Rourke et al. | 345/349 |
| 5,767,853 A | * | 6/1998 | Yoshida et al. | 345/349 |
| 5,845,067 A | * | 12/1998 | Porter et al. | 713/200 |
| 5,913,063 A | * | 6/1999 | McGurrin et al. | 395/702 |
| 5,922,054 A | * | 7/1999 | Bibayan | 709/328 |
| 5,933,599 A | * | 8/1999 | Nolan | 395/200.48 |
| 6,003,034 A | * | 12/1999 | Tuli | 707/101 |
| 6,057,835 A | * | 5/2000 | Sato et al. | 345/332 |
| 6,081,780 A | * | 6/2000 | Lumelsky | 704/260 |
| 6,085,120 A | * | 7/2000 | Schwerdtfeger et al. | 700/90 |

FOREIGN PATENT DOCUMENTS

EP 0 621 527 10/1994 .......... G06F/3/023

OTHER PUBLICATIONS

Cameron, Hugh et al., Speech recognition: From the lab to the real world, Telesis; Ottawa; Sep. 1996, Issue 101, pp. 28–36.*

Microwoft Windows Version 3.1 User's Guide, Microsoft Corporation, pp. 5–6, 11, 14, 30, 51–52, 71–75, 83–84, 91–95, 101–104, 107–109, 118, 130–131, 133, 139–141, 474–482, 487–489, 1992.*

(List continued on next page.)

Primary Examiner—Joseph H. Feild
Assistant Examiner—William L. Bashore
(74) Attorney, Agent, or Firm—Paul J. Otterstedt

(57) ABSTRACT

An interactive voice response (IVR) system comprises many different application objects which combine to deliver a voice application. These objects typically include IVR programs or scripts, prompts or voice segments and server scripts or programs for communicating with external systems or databases. Large voice applications can contain hundreds of application objects and potentially thousands of voice segments. The grouping of the application objects becomes more important in the later stages of the process. There is described a method of grouping data objects having different data categories, such as IVR programs or scripts, prompts or voice segments, in an application processing system. The method comprises associating a collection of such data objects with a group (a group such as the data objects within a voice application) and arranging the data objects into a sub-groups within the group where each sub-group corresponds to category of the data object (scripts, prompts, voice segments etc) and creating a graphical representation of the sub-groups using a graphical user interface.

39 Claims, 9 Drawing Sheets

OTHER PUBLICATIONS

Getting Started with Microsoft Windows, Microsoft Corporation, pp. 18–22, 29–45, 1992.*

Hied J and Norton P, "Inside the Apple Macintosh", Simon & SChuster Inc, New York, 1989, pp. 36, 37, 54–59, 412, 413.

WordPerfect version 6.1 for Windows, Novell Inc, 1991–1994. N.b file directory system.

Bitware version 3.24 for Windows version 3.10, Cheyenne Communication Inc, 1991–1995. N.b default file directory system and phone book function.

Bitfax Professional Lite version 3.03 for Windows version 3.10, Bit Software Inc, 1991–1994. N.b. default file directory system and phone book function.

* cited by examiner

Object category table

| Category | Name |
|---|---|
| 0 | state table |
| 1 | prompt |
| 2 | voice segment |
| 3 | 3270 script |
| 4 | customer server |
|  |  |
|  |  |

<u>A</u>

Catalog table

| Category | Application | Name |
|---|---|---|
| 1 | App B | object 1 |
| 1 | App C | object 2 |
| 4 | App B | object 3 |
|  |  |  |
|  |  |  |
|  |  |  |
|  |  |  |
|  |  |  |

<u>B</u>

Application table

| Application | Export time |
|---|---|
| App A | 19971201 235900 |
| App B | . . |
| App C | . . |
|  |  |
|  |  |
|  |  |
|  |  |

<u>C</u>

Objects table

| Category | Application | Name | Data | Last Update |
|---|---|---|---|---|
| 1 | App B | object 1 | - - - | 19991231 235900 |
| 1 | App C | object 2 | - - - | . . |
| 4 | App B | object 3 | - - - | . . |
|  |  |  |  |  |
|  |  |  |  |  |
|  |  |  |  |  |
|  |  |  |  |  |

<u>D</u>

FIG. 1  APPLICATION OBJECT RELATIONSHIPS

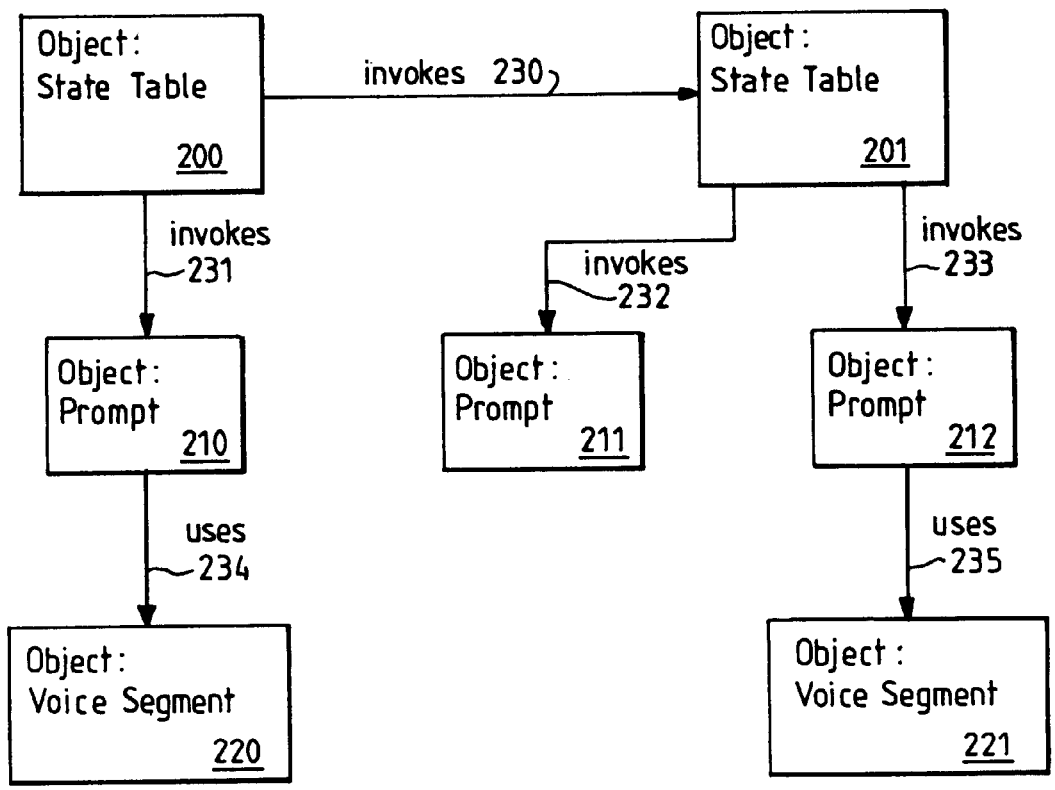
FIG. 2  DATA OBJECT DEPENDENCIES

DATA OBJECT MANAGEMENT SYSTEM

This invention relates to a data object management system for managing a collection of data objects of different types stored within a voice processing system.

BACKGROUND OF INVENTION

A voice application such as a fax back service or a voice mail system operates on a voice processing system such as the DirectTalk 6000 system from IBM Corporation (DirectTalk is a trademarks of IBM Corporation). Voice applications can make calls, answer calls, perform calculations, pass information from local or remote databases, communicate information to a caller by speaking it back over the telephone, let callers leave and retrieve messages, transfer calls to other applications, connection callers to a human operator, etc.

To perform these functions interactive voice response (IVR) systems comprise many different application objects which combine to deliver a voice application. These objects typically include IVR programs or scripts, prompts or voice segments and server scripts or programs for communicating with external systems or databases. Large voice applications can contain hundreds of application objects and potentially thousands of voice segments.

The process of writing a voice application includes several method steps: planning, design, implementation and test, package and distribution, maintenance and support. The method steps are taken in turn and considered in the light of the previous step. The grouping and organising of the application objects is an important factor in the process and particularly in the later stages.

Planning involves deciding what the purpose of the voice application is. The data requirements are considered at this stage such as what data is to be used and where and in what form is it stored. In the design stage further data considerations are needed and prototype application objects such as voice segments may be recorded and stored. The implementation and test stage of the voice response service creation involves further consideration of the data. Voice segments are recorded, prompts, state tables, 3270 server scripts, custom server programs are designed and built (the latter two being DirectTalk data objects). Each of these components is stored as a data object and saved in the voice processing system in a folder associated with the application.

Until now, in a system which is supporting multiple applications, there has been no standard way to group the data objects together when implementing, maintaining and distributing. In the implementation stage problems arise when a large number of programmers are involved with the voice application. If there is no agreed grouping of the data objects then additional time is spent in locating the appropriate data object by other members of the implementation team. Time is also spent identifying data objects that are need to be modified when maintaining an application or are need to be exported to another application. Developers or administrators of IVR systems require organised application objects for ease of maintenance and for distribution to other systems.

Components of a voice application may be developed on a system reserved for development and need to be distributed to multiple systems. To do this an application must be exported from the voice processing system. In the Direct-Talk system, a single file is created for transporting which is then imported into the host system. The grouping of the application objects is important at this stage so that the appropriate application objects may be selected efficiently and without error.

SUMMARY OF INVENTION

According to one aspect of the invention there is provided a method of grouping data objects in a application processing system, said data objects having a plurality of data categories, said method comprising: associating a plurality of data objects with a group; arranging the data objects into a sub-groups within said group, each sub-group corresponding to the data category of the data object; creating a representation of the sub-groups.

To assist with the organisation of application objects, a concept of an application is introduced. This can be regarded as a container for application objects which are required to deliver a voice application (or applications).

An application is represented in the IVR Graphical User Interfaces as an icon, which is opened to display a graphical container. The developer or administrator can drag existing objects and drop them into the appropriate application window. Where the developer or administrator is unsure of what application objects are co-requisites, then they may select a set of objects and request that their dependencies (i.e. those objects which are directly or statically invoked or used by the object—see FIG. 2) are displayed. This data is represented in a similar manner to an application, and the objects may be dragged into the appropriate application window in order to move them. The use of the dependencies greatly simplifies the process of grouping the data within the application and reduces the possibility that an error will be made.

As the first object of a particular type (e.g. IVR script or voice segment) is dropped into an application window, then a folder to retain those objects is automatically created (see FIG. 6) and displayed. These folders can be opened to reveal an iconic or text (details) view of those objects. selecting an object will invoke the appropriate IVR editor for that object.

To aid in the distribution of applications to other systems or for backup purposes, the entire application may be exported. The last modification time of all data objects is stored within each object, which supports a delta export capability which allows all voice objects modified since the last export, or a user specified time, to be automatically selected and exported Without the concept of an application, the developer or administrator would need to manually determine at export time what data should be exported, which is both time-consuming and error-prone.

In the preferred embodiment the group selected is a voice application and said plurality of data objects are the data objects necessary for functioning of the voice application.

In the same embodiment a different group may be selected comprising the dependencies of a particular data object and said plurality of data objects are a collection of all the other data objects that are required by the particular data object. In this case the data object has the capacity to use other data objects. Furthermore the embodiment further comprises the step of identifying all the data objects used by a particular data object and associating said data objects with a group.

In the same embodiment another group may be selected comprising a collection of all the data objects that are intended to be exported to another application processing system. In this case the method may further comprise the step of associating each data object with an export status which indicates whether the data object has changed since the last time it was exported. The export status advantageously contains the time and date when the data object last changed.

In the preferred embodiment each sub-group is advantageously represented by a graphical folder icon corresponding to the data category. It is this icon which may be selected by the user so that the data objects pointed to by that icon may be then viewed and managed, preferably the method further comprises, on selecting of a particular graphical folder icon by a user, creating a representation of the data objects within that sub-group. These icon may then be selected and various management function executed in respect of them such as copying, deleting or updating.

In the preferred embodiment the method further comprises storing the data objects in an object table within the voice processing system. The object table advantageously comprises, for each data object, data category of the data object, application associated with the data object, the name of the data object, the data of the data object and the date and time of the last update of the data object. More advantageously a summary of the details of all the data objects are stored in a catalog table.

BRIEF DESCRIPTION OF DRAWINGS

In order to promote a fuller understanding of this and other aspects of the present invention, an embodiment will now be described, by way of example only, with reference to the accompanying drawings in which:

FIGS. 1A–D shows a simplified version of the data base structures which implement the described solution;

FIG. 2 is a schematic representation of object dependencies;

DETAILED DESCRIPTION OF PREFERRED EMBODIMENT 1.0 Description of Structure and Function of the Preferred Embodiment FIG. 1 shows the database structures which implement the described solution. The category of each data object is stored in the object category table (see FIG. 1A). This shows that the types, "0", "1", "2", "3" and "4" have been defined. This data may have been supplied by the system (in the case of a "closed" system) or by the user.

An application is represented by an entry in the application table (FIG. 1C). This table shows that applications "AppA", "AppB" and "AppC" have been created. An application name is unique within the system.

The data objects within the system are stored in the objects table (FIG. 1D). The data objects may be represented in a single table or a multiple table; the latter being used where the system needs to support data objects with differing internal structures. The name of a data object is unique within the system. The objects table (FIG. 1D) contains a column which contains a timestamp which records the date and time each data object was last modified. A data object may only be created if the specified category exists in the object category table (FIG. 1A) and if the application exists in the application table (FIG. 1B). Adding an entry into the objects table (101) will also add an entry to the "catalog" table (FIG. 1B). Deleting a data object from the object table (FIG. 1D) will also delete the corresponding entry from the catalog table (FIG. 1B). Updating the application name or object name in the object table (FIG. 1B) will cause the corresponding entry in the catalog table (FIG. 1B) to also be updated. In the figure we see that there are 3 data objects in the system, "Object1" belonging to application "AppB" of category "1", "Object2" belonging to application "AppC" of category "1", and "Object3" belonging to application "AppB" of category "4".

Figure 5:
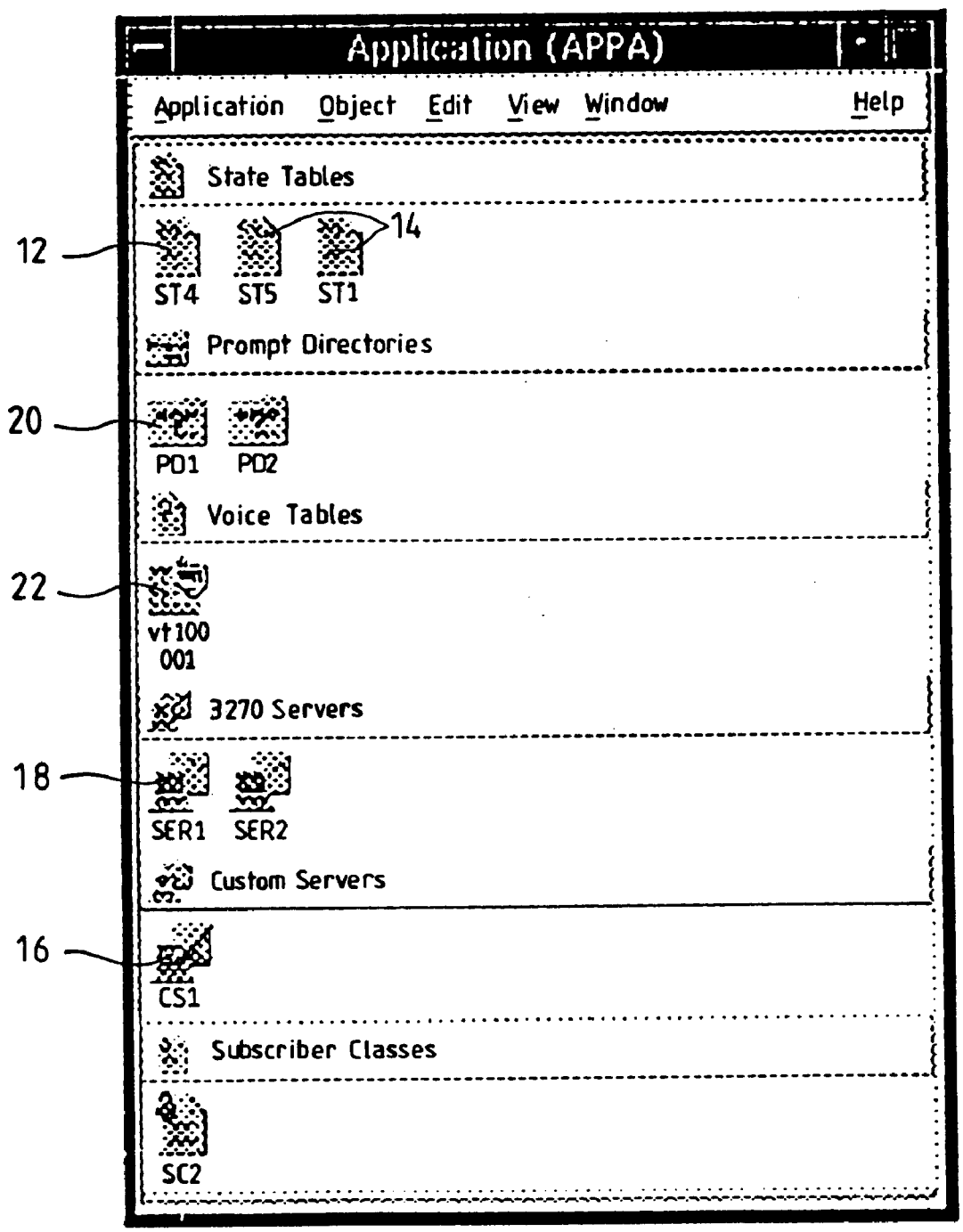
FIG. 5 is a representation of the voice application object within an application.

The existence of the catalog table (FIG. 1B) provides a single data entity which shows which data objects belong to an application and their respective types. This permits a single database query to return a) the distinct types of data objects within a specified application and b) the names of the data objects of a specified type within a specified application. The system supports internal programming interfaces which provide this information. These interfaces are used by the GUI to create a window which visually represents an application with folders which represent the types of data objects which exist in that application, as shown in FIG. 5. If a data object is created in an application and a data object of the same category does not already exist in that application, then the folder will be automatically displayed.

FIG. 2 shows a subset of the data objects in a system. A particular data object has certain static dependencies, in that it contains the names of other objects which may exist on the system and which are used by the particular data object. These cross references are maintained by the voice processing system as objects are created, updated and deleted. FIG. 2 shows a state table (200) and a state table (201). This type of object is an executable object, and we note that object 200 invokes (or executes) object 201, as represented by the dependency 230. There are also further data objects, a prompt (210), a prompt (211) and a prompt (212). Prompts are executable objects. The state table 200 invokes prompt 210 as represented by dependency (231), the state table 201 invokes both prompt 211 as represented by dependency (232) and prompt 212 as represented by dependency (233). There are further objects, a voice segment (220) and a voice segment (221). These objects are data only objects, and voice segment 220 is used by prompt 210 as represented by dependency (234) and voice segment 221 is used by prompt 212 as represented by dependency (235).

Figure 4:
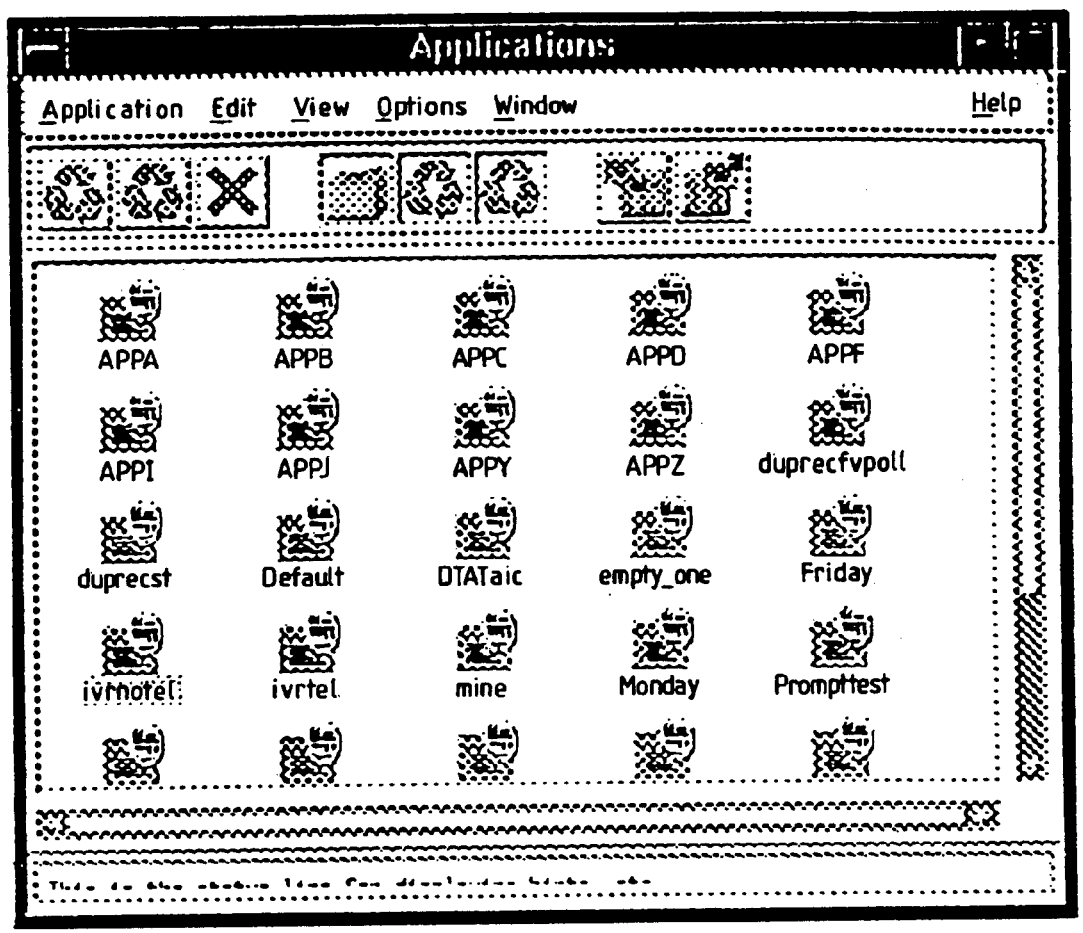
FIG. 4 is a representation of graphical window showing some voice applications.

FIG. 4 shows a Graphical User Interface for such an Application Manager as described above. Each icon represents a separate application in the system; the data used to create the icon is derived from a database query which selects all applications which exist in the "application" table (FIG. 1C).

As shown in FIG. 5 the user has opened the "APPC" Application by double clicking on the icon or selecting the "Application→Open" file menu, and the Application (APPA) window is displayed. This Application window displays a folder for each data category which exists in that application. This data is derived from a database query which returns the distinct data categories which exist for that application from the catalog table (FIG. 1B). FIG. 5 shows the Application window with all the folders opened to reveal the data objects which exist in that application. As each folder is opened (either by clicking on the folder or selecting the "Object→OpenFolder" file menu, then a database query is performed to select all objects of the appropriate data category belonging to the given application.

Figure 6:
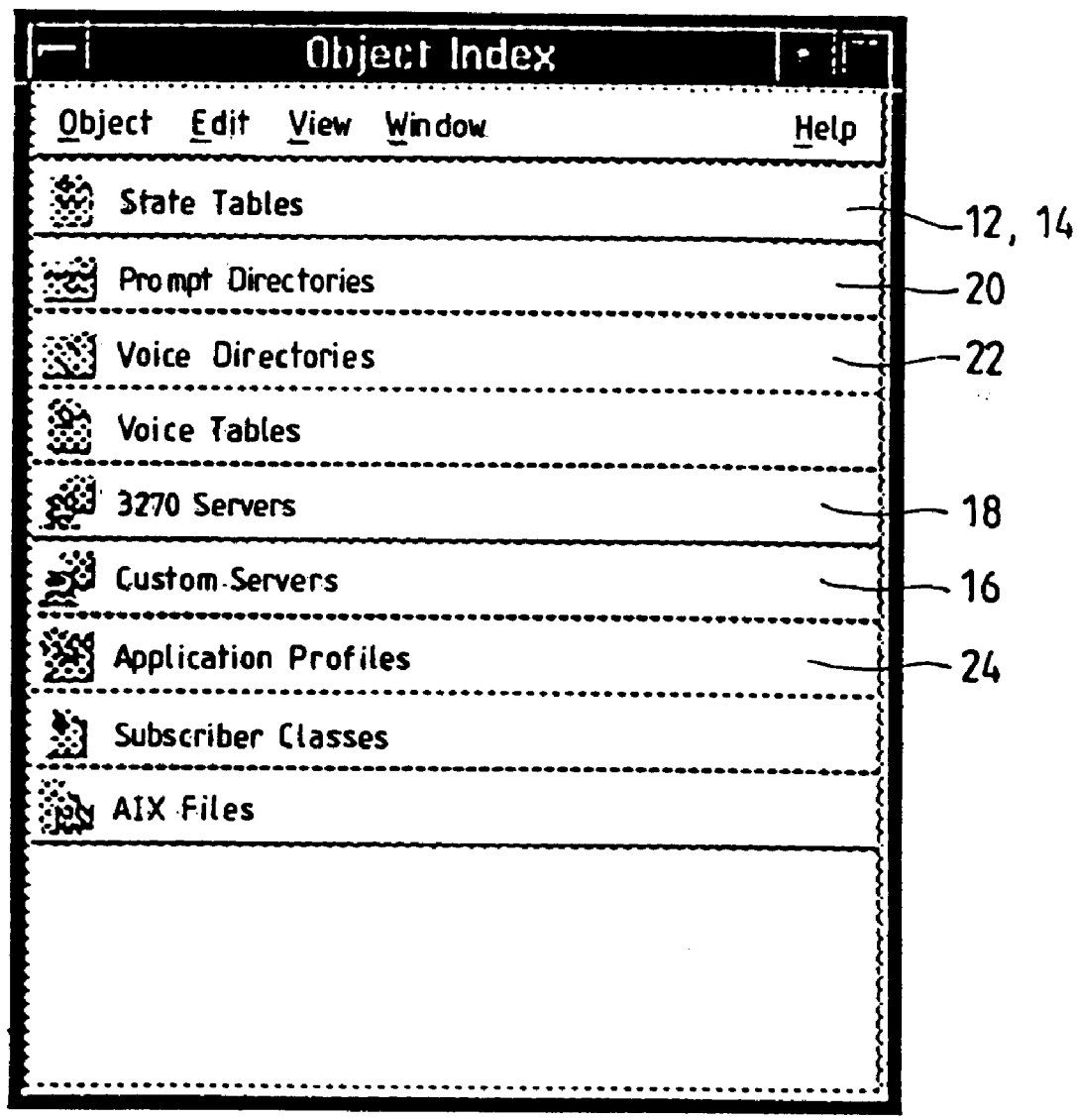
FIG. 6 is a representation of an object index.
Figure 7:
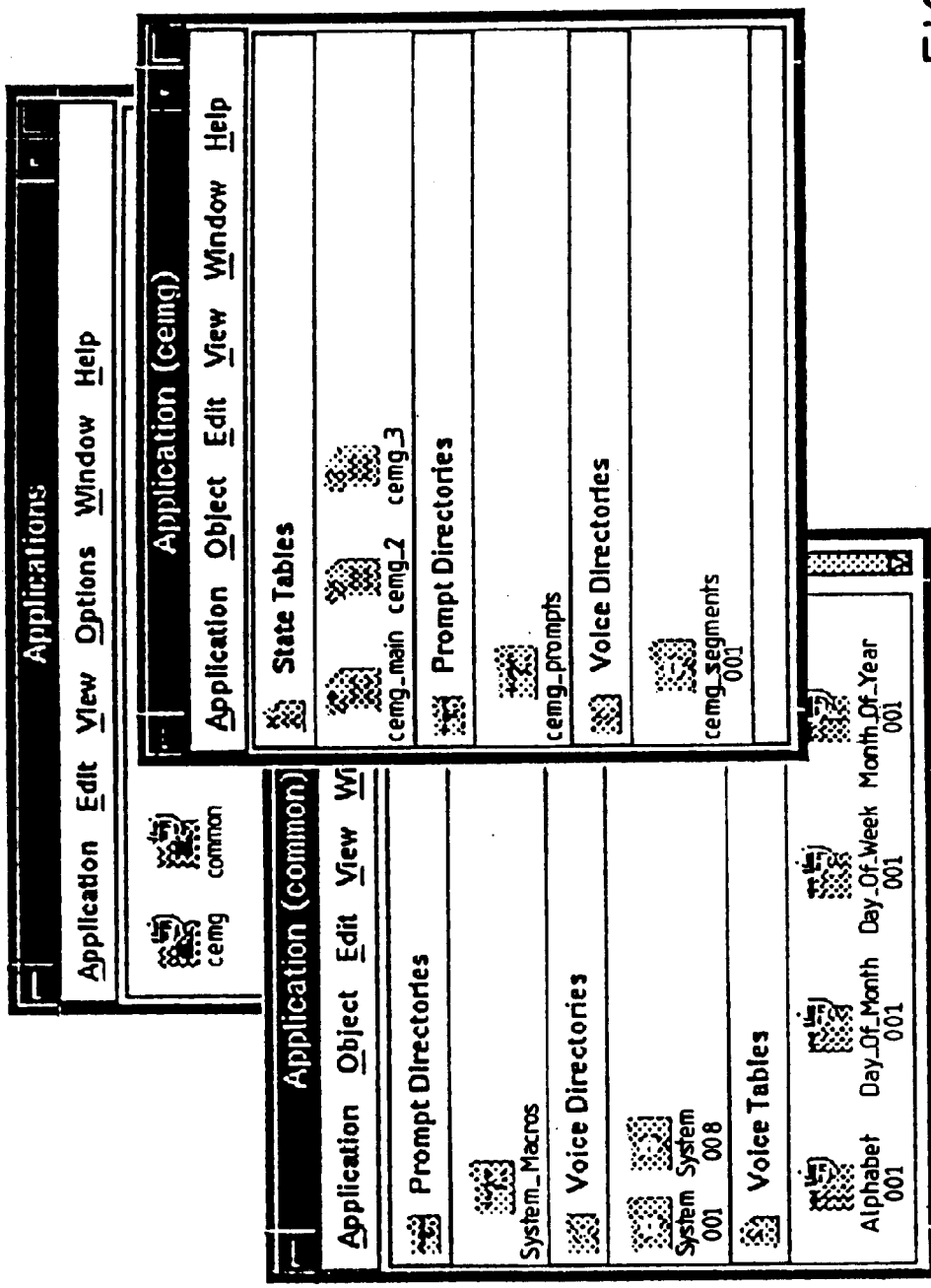
FIG. 7 is a representation of two applications, one of which contains commonly-used objects.

FIG. 6 illustrates another feature of the Application Manager, the Object Index. This window is very similar in appearance to the Application window (FIG. 5). However, this window displays all data objects in the system, regardless of which application they belong to. The database queries used are similar to that described above, under FIG. 5, except that data for all applications is selected instead of just a specified single application.

Figure 9A:
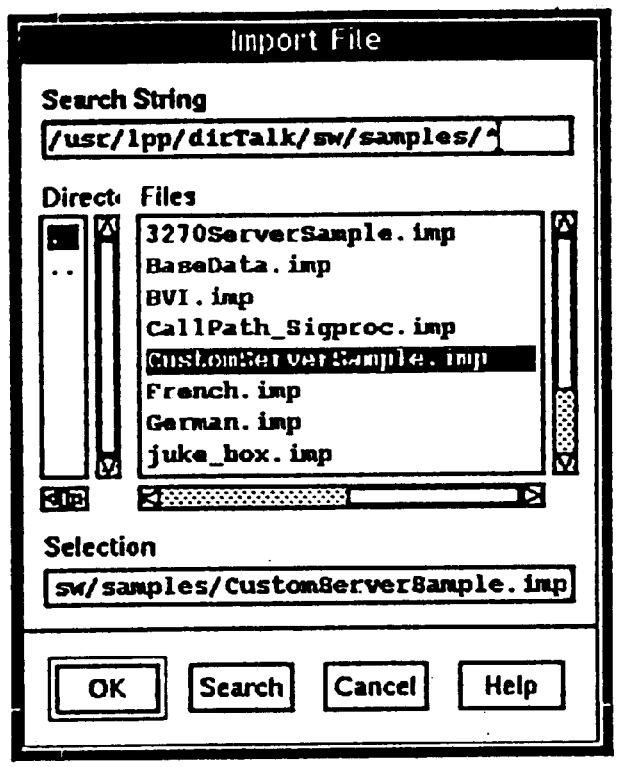
FIG. 9A is an import file window.
Figure 9B:
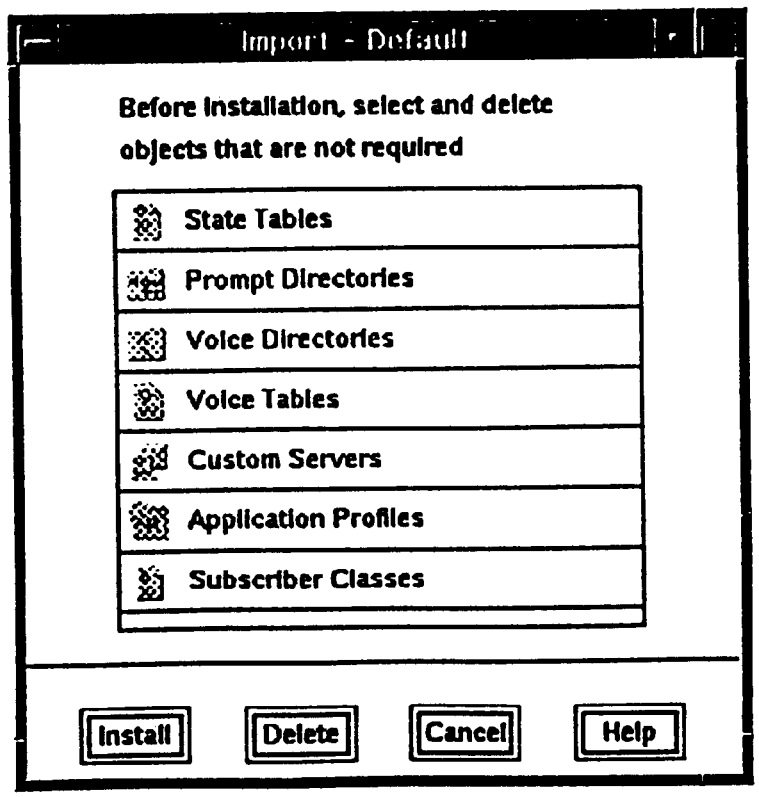
FIG. 9B is an import default window.

FIGS. 9A and 9B illustrate the importing of a previously exported application. The user has selected the "Application→Import with Preview→File" file menu and has been presented with a dialog box with which to specify the file name of the export package (FIG. 9A). Certain data from the export package is loaded into a temporary area on disk, to allow the preview window to be displayed (FIG. 9B). The data categories present in the import are again represented by folders derived from a database query which lists the distinct data categories which exist in the temporary catalog table (similar to FIG. 1B). The folders may be opened to view the data objects within, and if desired, the objects may be deleted from the folder if the user does not wish to install certain data objects. Finally, the user may select the "Install" button. This causes all data objects to be copied from their respective temporary tables on disk to actually install the objects in the system.

2.0 Description of Creation and Management of Application Objects

To implement a voice response service using a voice processing system such as DirectTalk a number of objects, which together comprise a voice application (10) need to be created. The concept of a voice application and its constituent objects are described below together with a description on how to create, manage, and distribute applications and objects.

2.1 What is a Voice Application?

Figure 3:
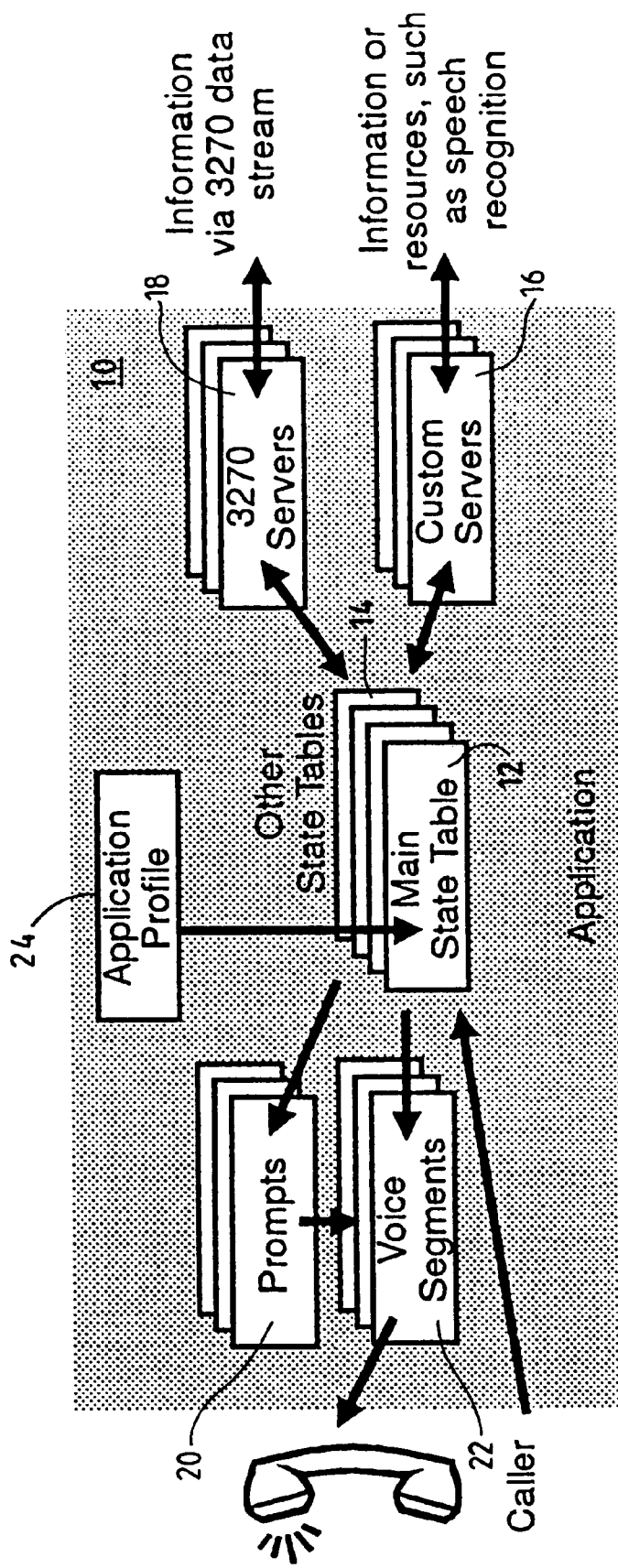
FIG. 3 is a schematic representation of voice application objects used in a voice processing system.

To create a voice response service, a number of objects of various types need to be created (or imported) (see FIG. 3). The heart of the voice application is a state table (12) which provides the logic of a voice application (10) (see "State Tables" in glossary).

A state table (12) can invoke:

other state tables (14);

custom servers (16) to provide access to data outside DirectTalk or services such as speech recognition and speech synthesis;

3270 servers (18), to provide access to data on host computers, via existing applications that use the 3270 data stream (see "3270 and Custom Servers" in glossary).

The state table (12) can invoke prompts (20) which are specialized programs that control the dialogue that the caller hears (see "Prompts" in glossary). Prompts are collected together in a prompt directory.

The recorded words or sounds that the caller hears are known as voice segments (22). Although these can be played directly by the state table, it is much more efficient to play each voice segment from a prompt (see "Voice Segments" in glossary). Voice segments are collected together in a voice directory, and can also be indexed by a voice table.

Typically, most voice applications also include at least one application profile (24), which defines various characteristics of the application. Application profiles have several functions. Each application profile (24) specifies a main (or initial) state table (12) which:

can be invoked in response to incoming calls if the application profile ID matches the called number or channel identification;

can be invoked by other state tables (14) (but note that you can invoke a state table (12) from another state table (14) without an application profile (24));

uses the specified language database to play prompts and voice segments, the same state table (12) can handle calls in different languages; only the application profiles (24) need to be different;

can access up to ten voice mailboxes, together with associated voice messaging resources, such as distribution lists, for use by the state table described in the profile;

files and databases containing information can be accessed by a custom server.

Some or all of these objects may comprise a voice application.

2.2 Discovering What Application Are Present in the System

To find the applications (10) Applications→Applications is selected from the Welcome window. The Applications window (FIG. 4) shows all the applications in the system.

To display the objects in each application, double-click on the icon that represents the application. The Application window (FIG. 5) shows a folder for each type of object in the application.

When an application object is open, a new one created, a container window listing all the objects of that type appears, followed by the editing window for that object (for example, the State Tables window, followed by the State Table window). The container window can be used to find objects, using the Search popup window.

2.3 Creating, Editing and Testing Application Objects

Most of the work involved in implementing a voice response service can be done from the Application window. The objects, except for the C or C++ code for custom servers can be developed using the editing window that opens when each object is opened. Alternatively, an ASCII editor can be used to develop the code for state tables, prompts, and 3270 scripts, which may then be imported into the appropriate editing window, by selecting Utilities→Import. The ASCII state tables and prompts can also be imported using a command that can be issued from the command line or from a script.

2.4 Finding Application Objects

To find out which application contains an object,

Options→Show Object Index may be selected from the Applications window. The Object Index window (FIG. 6) shows a folder for each type of object in the system.

2.5 Managing Application Objects Efficiently

If no applications are created, or none are imported which have already been created, all the objects are included in the default application, which cannot be deleted. The state tables will run successfully, whether or not other applications are created to put in the objects in. When the application is put into production, it is the application profile that defines the main state table and entry point to the runtime voice processing system. The purpose of the application is simply to make management and distribution of objects easier, and is not used by the runtime voice processing system.

2.6 Advantages of Creating Applications

The application provides a place to keep: all the objects required for a voice response service; all the objects shared by multiple voice response services; other objects that are not currently in use, or are under development. This enables one to: find objects easily; open objects for browsing or edition; delete objects from the system. The application also provides a checklist for: listing the dependencies (other objects used by the objects in the application); exporting all objects required for a voice response service; validating that all objects are present on a system (for example, before exporting or after importing an application package); and importing the application package.

Objects can be moved into and out of an application or can be copied to a different application. The integrity of applications that are already in use is protected by the voice processing system. Moving state tables and other objects around between applications has no effect on any objects that are in use at the time: it is simply like moving the names around at this point. However, if an object is deleted it will be deleted from the system, and a dialogue will check for confirmation, whether or not the object is in use. Similarly, a new version of a state table is imported that is already running (that is already cached), the running state table is not affected until the whole application package has been imported.

2.7 Allowing More Than One Application to Use the Same Object

The application is a container of application objects, which means that each object must be specified in at least one application. It is very likely that some objects will be useful in more than one voice response service: for example, voice segments for commonly-used phrases. Copying them has two disadvantages: storage is used unnecessarily. Instead of copying, an object can be made available to be used by more than one application, by putting it into a common application. A common application is just an ordinary application whose objects are to be used by more than one other application.

The common application can be added to the list of application prerequisites for any application that is to use it. When any of these applications is exported, the system allows the opportunity to export the common application at the same time allows for example, the "cemg" application in FIG. 5 includes all the state tables (12), and the specific prompts (20), voice segments (22) and voice tables used by those state tables; while the common application includes prompts (20), voice segments (22) and voice tables that might be used by other applications too.

2.8 Creating an Application

There are several ways of doing many of the tasks described in this section. The procedure describes the simplest way, usually drag and drop using a mouse with MOUSE BUTTON 1,2,3. Most tasks are also available from one of the pulldown menus on the menu bar, and from the object popup menu. To use the pulldown menu, select the object first and then select the menu option using MOUSE BUTTON 1. To use the popup menu, select the object first and then press MOUSE BUTTON 3. Alternatively, all tasks can be done using keyboard keys.

>>> Start welcome window→Applications→Applications

Naming the Application:
1. Select Application→New. The system displays the New Application window.

Creating an Application:
2. Type in the name (up to 16 characters) and, optionally, a description (up to 30 characters). The name must be unique.
3. Select Create. The icon for the new application is displayed in the Applications window (FIG. 4).
4. Double-click on the icon to display the Application window (FIG. 5).
5. You can now either move or copy existing objects into the application, or create new objects within it.

Moving an Object:
6. Open both the source and target Applications windows. It does not matter whether there is a folder for the type of object in the Application window, because folders are created automatically by the system; and it does not matter which folder you drop the object into, because the system makes sure it goes into the right one.
7. Select an object icon in the source Application window and drag it, using MOUSE BUTTON 1, to the target Application window. The icon is moved to the target Application window, and displayed in the appropriate folder. If you drag an object icon from the Object Index window (FIG. 6) into an Application window (FIG. 5), the object is not removed from the Object Index window (FIG. 6), but the application names is changed. The object appears in the target Application window (FIG. 5).

Moving Multiple Objects:
8. Select multiple object icons of the same type (in the same folder): you can either select adjacent objects by dragging diagonally across them using MOUSE BUTTON 1, or you can add objects to the selection by holding down the CTRL key while clicking with MOUSE BUTTON 1.
9. Drag them, using MOUSE BUTTON 1, to the target Application window (FIG. 6). The icons are moved to the target Application window, and displayed in the appropriate folder.

Copying an Object:
10. Select the object icon in the source Application window and drag it, using MOUSE BUTTON 2, to the target Application window.
11. Type in the name and, optionally, a description.
12. Select Create. The icon for the new object is displayed in the Application window.

Creating a New Object:
13. Select Object→New.
14. Select the type of object to create. The system displays the container window for that type of object, followed by the editing window.
15. Create the contents of the object, validate if necessary, and save it. View→Refresh are selected, the icon for the new object is displayed in the Application window. If a new object is created within the Object Index window, the object is stored in the default application and displayed in the Application (default) window.

Creating More Objects:
16. Further objects can be created of the same type by repeating steps 13 and 14, or by selecting New from the appropriate menu in the container window.

Adding Dependent Objects:
17. Select an object and then select Dependencies from the object's popup menu. The system displays the Dependencies window (see glossary for definition of dependencies).
18. Drag dependent objects into the Application window. these objects have been moved into the application and are now part of this application and not part of any other applications. If more than one application is wanted to use a specific object a new application should be created to contain one or more objects and then specify it as an application prerequisite (see "Allowing More Than One Application to Use the Same Object" in section 2.7).

Figure 8A:
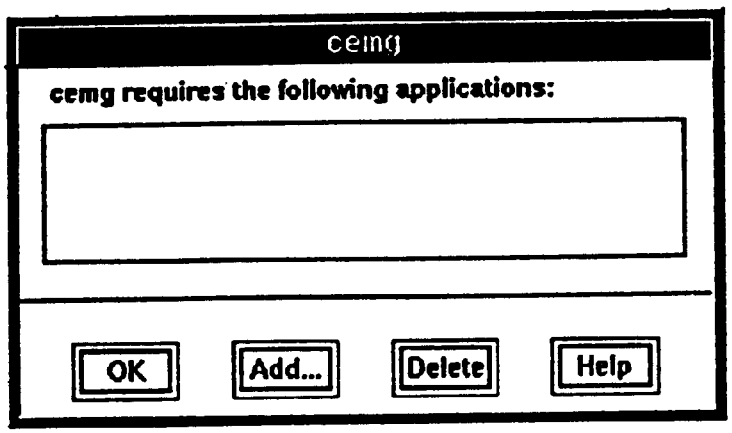
FIGS. 8A, 8B & 8C are windows used when adding application prerequisites.
Figure 8B:
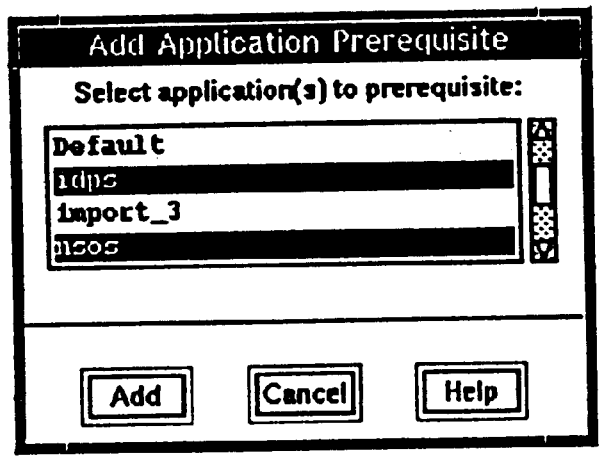
Figure 8C:
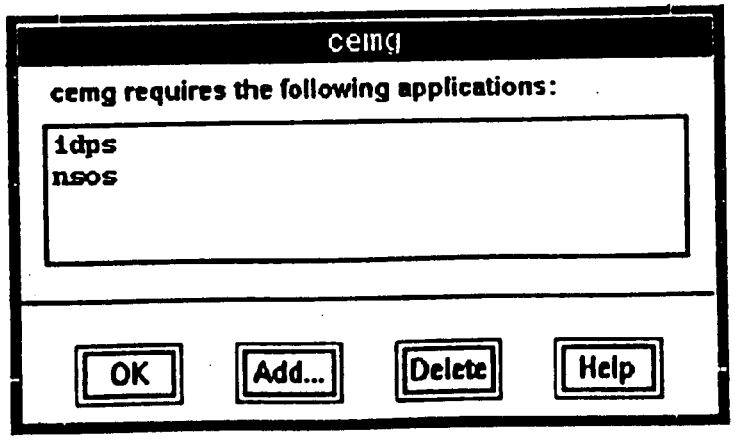

Adding Application Prerequisites:
19. Select Application Prerequisites from the application's popup menu. The system displays the Application Prerequisites window (FIG. 8A).
20. Select Add to add more applications. The system displays the Add Required Applications window.
21. Select one or more applications (see FIG. 8B).
22. Select Add the system displays the Application Prerequisites window (see FIG. 8C).
23. Select the applications that are no longer required.
24. Select Delete. The system removes the applications from the list in the Add Application Prerequisites window. The applications are not deleted from the system.

2.9 Exporting an Application

Application objects need to be exported before archiving them or distributing them to other systems.

Several types of object export are possible, a complete application; only those objects which have changed since either the last export time or a date and time you specify; or selected individual object. In addition, you can choose to export only runtime objects.

An application can be exported from:
the Applications window (from the Application menu or from the application's popup menu). the Application window (from the Application menu). >>>Start Welcome window→Applications→Applications 1. Select the application.

Exporting the Complete Application:

2. Select Application→Export→Full. The system displays the Export Application window.

3. Proceed to step 11.

Exporting Updated Objects Only:

4. Select Application→Export→Delta. The system displays the Export Application window.

5. Select the appropriate radio button for objects changed since Last Full Export, Last Delta Export, or a Specific Data, and if necessary fill in the date field.

6. Proceed to step 11.

Choosing Object to Export:

7. Select Application→Export→Partial. The system displays the Export Application window. All the objects in the application are listed.

Exporting an Application:

8. To remove an object from the list, select it and then select Delete from the popup menu.

9. To add all the objects that are used by an object in the list, select the object and then select Get Dependencies from the popup menu.

10. To add an object from another application to the list, open the other application. Then select the object in the Application window and drag it into the Export Application window.

Exporting Runtime Object Only:

only the binary objects are required for runtime systems, but export text objects might need to be exported too.

11. Select the appropriate radio button for Text and Binary (executable) objects, or Binary only.

Specifying Where to Put the Export Tile:

12. Select the appropriate radio button for media type. If File is selected the system displays the Export File window.

a) Select the directory and select or type in the file name of the export file.

b) Select OK.

The progress of the export process is displayed on the status line in the Applications window.

Next Step:

The export file is now ready to be transported to another system. Use whichever method normally used for this (for example, file transfer protocol (ftp)).

2.10 Exporting One or More Objects

One or more objects can be exported from the Object Index Window (FIG. 4). >>>Start Welcome window→Applications→options→Show Object Index Selecting the Objects to Export:

1. Select one or more objects.

2. Select Object→Export→Partial. The system displays the Partial Export window.

3. To remove an object from the list, select it and then select Delete from the popup menu.

4. To add all the objects that are used by an object in the list, select the object and then select Get Dependencies from the popup menu.

5. To add an object from another application to the list, open the other application. Then select the object in the Application window and drat it into the Partial Export window.

Exporting Runtime Object Only:

Only the binary objects are required for runtime systems, but you might want to export text objects as well.

6. Select the appropriate radio button for Text and Binary (executable) objects, or Binary only.

Specifying Where to Put the Export File:

7. Select the appropriate radio button for media type. If the select File, the system displays the Export File window.

a) Select the directory and select or type in the file name for the export file.

b) Select OK. The progress of the export process is displayed on the status line in the Applications window.

Next Step:

The export file is now ready to be transported to another system. Use whichever method normally used for this (for example, file transfer protocol (ftp)).

2.11 Importing Application Objects

Any file can be imported that was exported from a voice processing system such as DirectTalk system using the procedure described in 1.9 "Exporting One or More Objects", or "Exporting an Application".

Application objects can be imported from: the Applications window (FIG. 4) from the Application menu or from the application's popup menu; or the Application window (FIG. 5) from the Application menu. >>>Start Welcome window→Applications→Applications 1. If objects need to be imported into an application that already exists, select the application.

Simply Importing a Filed:

2. Select Application→Import→File. The system displays the Import File window.

3. Type the path name in the Search String field, followed by an asterisk (*). For example:

/usr/1pp/dirTalk/sw/samples/*

4. Select the file from the Files list (see FIG. 9A).

5. Select OK. The system displays the Import Report window. The progress of the import process is also displayed on the status line in the Applications window.

Simply Importing From Tape or Diskette:

6. Ensure that the Default Tape Drive or the Default Diskette Drive system parameter in the DirectTalk parameter group is set as appropriate.

7. Select Application→Import→Tape or Diskette. The system displays the Import Report window. The progress of the import process is also displayed on the status line in the Applications window.

Checking the Objects You are Importing From a File:

8. Select Application→Import with Preview→File. The system displays the Import File window.

9. Type the path name in the Search String field, followed by an asterisk (*), for example:

/usr/1pp/dirTalk/sw/samples/*

10. Select the file from the Files list.

11. Select OK. The system displays the objects included in the file (see FIG. 9B).

12. Open and close the folders by single-clicking on the folder icon. Select any objects you do not want to import. For the most efficient application, it is recommended t ensure that the export file contains the correct set of objects and then import all of them, rather than exporting more than is needed and then picking the ones not wanted. See section 2.9 "Exporting an Application".

13. Select Remove. The selected objects are removed from the list. (If one is removed by mistake, select Cancel and start over).

14. Select Import. The system displays the Import Report window. The progress of the import process is also displayed on the status line in the Applications window.

Checking the Objects You are Importing From Tape or Diskette:

15. Ensure that the Default Tape Drive or the Default Diskette Drive system parameter in the DirectTalk parameter group is set as appropriate.
16. Select Application→Import with Preview→Tape or Diskette. The system displays the objects included in the file.
17. Open and close the folders by single-clicking on the folder icon. Select any objects you do not want to import.
18. Select Remove. The selected objects are removed from the list. (If you remove one by mistake, select Cancel and start over).
19. Select Import. The system displays the Import Report window. The progress of the import process is also displayed on the status line in the Applications window.

3.0 Glossary

APPLICATION:

A set of data objects which, when aggregated contain all the data objects necessary to run part or all of an application.

DATABASE:

A logical and physical mechanism for storing data in a computer system.

DATA OBJECT:

A data entity supported within the system (eg file, program)

DEPENDENCY:

A property of certain objects (as defined by the system) which means a data object may be used by another data object.

STATE TABLES:

A state table is a sequence of states, each of which performs a specific action, which can have one or more possible results. During a telephone call, the voice application progresses through the states, performing the actions in turn. The result of each action determines the next state to go to. See FIG. 8 on page 58 for an example of a state table.

A state table can invoke a nested state table to perform a set of actions before returning control to the invoking state table. The state table can invoke different state tables depending on a condition, such as the response of the caller to a previous prompt.

There is a range of state table actions, from very general, such as AssignData, which performs a variety of computational functions, to very specific, like ControlMusic, which is used to turn the volume of background music up or down. Because the general actions can be combined in so many ways, this list may not be exhaustive, but it does give a goal-oriented overview of which action to choose to perform application functions.

PROMPTS:

Prompts are used in state tables to define what a caller hears. A prompt not only identifies the words the caller hears, but also defines the logic of when and how the words are played.

A prompt can be simple or complex, depending on whether the prompt always plays the same words or whether the prompt logic defines conditions for playing different phrases. For example, you may want an application to repeat the items that the caller has ordered, so the prompt would construct the utterance with phrases representing those items: "you ordered a bagel with sour cream and lox, and a croissant with Canadian ham and salad".

Prompts are constructed using the prompt statements described in the State Tables, Prompts, and Voice Segments reference manual. The variables used by prompt statements work exactly the same way as state table variables. Generally, a state table passes input parameters to a prompt which it then uses to select the voice segments to play to the caller.

The set of prompts that are used by a particular state table are grouped in a prompt directory. All prompts used by a state table must be in the same prompt directory. Multiple state tables can use the same prompt directory.

VOICE SEGMENTS:

A voice segment defines the spoken words (for example, "hello" or "good morning") or sounds (for example, music) available to DirectTalk voice applications. A segment can be a single word, a sound, a phrase, one or more sentences, or a combination of words and sounds. A segment can also be silence.

System voice segments in several languages, including U.S. English, are provided with DirectTalk, and listed in the State Tables, Prompts, and Voice Segments reference manual.

The same voice application can play voice segments in different languages, without modification. The language used when the application is run in a production environment is specified in an application profile, and you can have one application profile for each language.

3270 AND CUSTOM SERVERS:

Custom servers and 3270 servers are programs that provide a bridge between DirectTalk and data that resides outside DirectTalk. The data can be on a remote host computer or on the same RS/6000 workstation as your DirectTalk software. The data can include business information held in a database, or digitized voice data.

A custom server lets you access data on any host computer and provides a C or C++ interface to the DirectTalk database. A custom server is a program, using C language or C++ language, to provide an interface between data on host computers and DirectTalk, or performs other processes, such as speech recognition and speech synthesis, generation of fax output, or coordinated call and data transfer.

A custom server that uses the signalling interface, a specialized library of C subroutines, is known as a signalling process. This is used to manage an external signalling device that controls or monitors telephony channels.

A 3270 server lets you access data on remote 3270 host computers. If you have existing 3270 host applications that retrieve data needed by your DirectTalk voice applications, you can create a 3270 server to obtain this data.

Access to remote data means that your voice applications can use this data to perform a variety of tasks, such as:

read a file or database to retrieve information that a caller needs;

maintain or manipulate files based on a caller's request;

obtain information from a combination of sources and business applications on other host computers;

call another program to perform any predefined process;

perform calculations and return the result to the state table;

generate business statistics based on telephony activity;

recognize spoken words using an external speech recognition server;

speak words created by an external text-to-speech server or sent from another DirectTalk system;

generate fax output.

Both 3270 servers and custom servers must be invoked from a state table, which controls the dialog with the caller.

What is claimed is:

1. A method of grouping data objects in a application processing system for generating voice applications from the data object said method comprising:

forming voice applications by associating a plurality of interoperating data objects into groups each group representing a different voice application;

arranging the data objects into sub-groups within said each group, each sub-group corresponding to one of a plurality of data categories of the data objects in the group each category being data objects of one type used in a voice application system including at least one category being data objects including a voice segment;

creating a visual representation, for presentation on a graphical user interface, of the categories, the groups and the sub-groups which representations display symbols for the objects in the category and subgroup representations for manipulation by the user to form groups and to change the data objects associated within the groups and in so doing change the contents and functioning of voice applications;

representing each subgroup in a group separately in the group representations and data objects in a group as a separate icon positioned in the appropriate subgroup representation of the group and the subgroup representation; and maintaining interactive listings for the categories, the groups and the subgroups allowing only data objects applicable to a subgroup listed in the category listings to be included in the group and subgroup listings.

2. A method as claimed in claim 1 wherein said group comprises the dependencies of a particular data object and said plurality of data objects are a collection of all the other data objects that are required by the particular data object.

3. A method according to claim 2 wherein a data object has the capacity to use other data objects.

4. A method according to claim 3 further comprising the step of identifying all the data objects used by a particular data object and associating said data objects with a group.

5. A method as claimed in claim 1 wherein said group is an export group and said plurality of data objects are a collection of all the data objects that are intended to be exported to another application processing system.

6. A method according to claim 5 further comprising associating each data object with an export status which indicates whether the data object has changed since the last time it was exported.

7. A method according to claim 6 further wherein said export status contains the time and date when the data object last changed.

8. A method as claimed in claim 7 wherein the representation of each sub-group is a graphical folder icon corresponding to the data category.

9. A method as claimed in claim 8 further comprising on selecting of a particular graphical folder icon by a user, creating the symbols of the data objects within that subgroup.

10. A method as claimed in claim 6 including representing each object category in a application separately in the representations of the application and data category folder and data objects in an application as a separate icon in the appropriate object category representation of the application and the object category representations.

11. A method as claimed in claim 10 including maintaining separate tables for the category groups and application folders allowing only data objects having a data category to be included in the category group and application folders.

12. A method as claimed in claim 11 wherein the application is a voice application and the data categories include a state table category, prompts category and a voice segment category, wherein the state tables use the prompts to determine the words a caller hears from the voice segments.

13. A method as claimed in claim 12 allowing a user to add an object and its function to a voice application by dragging and dropping the icon representing that data object to the representation of a target group.

14. A method as claimed in claim 13 including using the data categories for automatically placing the icon dragged to the target group in the subgroup representing the data object assigned category irrespective of where the icon is dropped in the representation of the target group.

15. A method as claimed in claim 14 including having a default application folder in the application processing system which group and its contents are permanently contained in the category and application folders.

16. A method as claimed in claim 1 allowing a user to add an object and its function to a voice application by dragging and dropping the icon representing that data object from the representation of the subgroups to the representation of a target group.

17. A method as claimed in claim 16 including using the category listing for automatically placing the icon dragged to the target group in the subgroup representing the data objects assigned category irrespective of where the icon is dropped in the representation of the target group.

18. A method as claimed in claim 17 including having a default group in the application processing system which group and its contents are permanently contained in the category, subgroup and group tables.

19. A method as claimed in claim 1, wherein the data categories include a state table categories, prompts category and a voice segment category, wherein the state tables use the prompts to determine the words, a caller hears from the voice segments and the responses a caller receives is changed by changing the prompt controlling the voice segment.

20. A system for grouping data objects into voice applications in a application processing system, said system comprising category means for listing of data categories of the objects;

application means for listing applications containing the data objects; means for associating a plurality of data objects with a group listed in the application means;

means for arranging the data objects in the listed group in sub-groups within said group, each sub-group corresponding to a different data category of the data objects in the group, wherein said group is a voice application and said plurality of data objects are the data objects necessary for functioning of the voice application wherein the categories of concepts include at least one object from each of the categories of state table, prompt, voice segment, and application profile objects where the state tables use the prompts to determine the words a caller hears from a voice segment; and means for creating graphical user interface representations of the category listing, the application listing and the listed group with the data objects in the category and the subgroup listings each represented by an icon movable to and from the subgroups by a user to change the makeup and functioning of voice applications of the group.

21. A system as claimed in claim 20 wherein said group comprises the dependencies of a particular data object and said plurality of data objects are a collection of all the other data objects that are required by the particular data object.

22. A system according to claim 21 wherein a data object has the capacity to use other data objects.

23. A method according to claim 22 further comprising means for identifying all the data objects used by a particular data object and associating the identified data objects with the group.

24. A system according to claim 20 further comprising means for storing the data objects in an object table within the voice processing system.

25. A system as claimed in claim 24 wherein the object table comprises, for each data object, data category of the data object, application associated with the data object, the name of the data object, the data of the data object and the date and time of the last update of the data object.

26. A system according to claim 25 wherein a summary of the details of all the data objects are stored in a catalog table.

27. A system as claimed in claim 20 wherein said group is an export group and said plurality of data objects are a collection of all the data objects that are intended to be exported to another application processing system.

28. A system according to claim 27 further comprising means for associating each data object with an export status which indicates whether the data object has changed since the last time it was exported.

29. A system according to claim 28 wherein said export status contains the time and date when the data object last changed.

30. A system as claimed in claim 29 wherein each sub-group of the group is represented by a graphical folder icon corresponding to its data category.

31. A system as claimed in claim 30 further comprising means for, on selection of a particular graphical folder icon by a user, creating a representation of the data objects within that sub-group.

32. A method of grouping data objects in a voice responsive applications using a application processing system comprising:

assigning data categories to the objects based on their function in voice response systems;

having a plurality of interrelated logic structures including a category listing of the data objects by their data category and application listing, of applications including at least one application for a-voice response system;

arranging the data objects in the voice response application into a group divided into subgroups each subgroup corresponding to the data category of all the data objects in the subgroup;

creating a graphical interface with the data objects each represented by an icon and the category and application listings represented by windows;

providing a window containing the voice response application when the application is selected in the applications window, the voice response window containing the icons for the objects arranged in the subgroups; and providing icons of objects in a category of the category listing and moving one of the provided icons to the appropriate subgroup of the application window so that the concept represented by the moved icon is included in the application.

33. The method of claim 32 providing a second listed application in the application listing which application includes the one application as a category in the second application group.

34. A method as claimed in claim 32 including representing each subgroup in a group separately in the group representation and data objects in a group as a separate icon in the appropriate subgroup representation of the group and the subgroup representation.

35. A method as claimed in claim 34 including maintaining separate tables for the categories, the groups and the subgroups allowing only data objects applicable to a subgroup listed in the category tables to be included in the group and subgroup tables.

36. A method as claimed in claim 35 allowing a user to add an object and its function to a voice application by dragging and dropping the icon representing that data; object from the representation of the subgroups to the representation of the target group of the voice application.

37. A method as claimed in claim 36 including automatically placing the icon dragged to the target group in the subgroups representing the data objects assigned category irrespective of where the icon is dropped in the representation of the target group.

38. A method as claimed in claim 37 including having a default group in the application processing system which group and its contents are permanently contained in the category, subgroup and group tables.

39. A method as claimed in claim 32, wherein the data categories include a state table categories, prompts category and a voice segment category, wherein the state tables use the prompts to determine the words a caller hears from the voice segments and the responses a caller receives is changed by changing the prompt controlling the voice segment.

* * * * *